3,167,538
PROCESS FOR ALKOXYLATING A MIXTURE OF METHYL GLUCOSIDE AND A HYDROXY COMPOUND, AND THE PRODUCT OF THAT PROCESS
Donald W. Kaiser and Stephen Fuzesi, Hamden, Conn., assignors to Olin Mathieson Chemical Corporation, a corporation of Virginia
No Drawing. Filed May 24, 1962, Ser. No. 197,245
9 Claims. (Cl. 260—210)

The present invention relates to a novel process for the alkoxylation of methyl glucoside and to the improved product resulting from said process.

Methyl glucoside is derived from corn starch and is commercially available at a reasonable price competitive with industrial polyols. The product is a stable mixed acetal of glucose and methyl alcohol containing four hydroxyl groups. The hydroxyl groups are capable of polyetherification with an alkylene oxide, especially ethylene or propylene oxide, to yield appropriate derivatives for subsequent cross linking with diisocyanates to form polyurethane foams.

Methyl glucoside is a relatively high melting solid which melts at 168 to 169° C. when pure. The solid methyl glucoside must be transformed to the molten state in order to be reacted with an alkylene oxide in the presence of a basic catalyst to form the methyl glucoside polyethers useful in the preparation of the polyurethane foams. A disadvantage of the use of methyl glucoside in the preparation of methyl glucoside polyethers is that high temperature alkoxylation tends to produce undesirable color. Furthermore, when methyl glucoside is alkoxylated to the desired hydroxyl number for use in rigid polyurethane foams, the resultant alkoxylated methyl glucoside is too viscous for convenient handling and reaction.

It is, therefore, an object of the present invention to provide a novel process for the preparation of alkoxylated methyl glucoside.

It is a further object of the present invention to provide a novel alkoxylated methyl glucoside product.

It is a still further object of the present invention to provide a process as above which avoids the art disadvantage of undesirable color formation.

It is a still further object to provide a process as above which is capable of preparing alkoxylated methyl glucoside for use in rigid polyurethane foams without the disadvantage of high viscosity.

Further objects and advantages of the present invention will appear hereinafter.

In accordance with the process of the present invention it has now been found that the foregoing objects and advantages may be accomplished and a novel alkoxylated methyl glucoside product prepared by: admixing methyl glucoside with a hydroxy compound in a molar ratio of methyl glucoside to hydroxy compound of between 1:0.1 and 1:10, said hydroxy compound being selected from the group consisting of a polyhydric alcohol containing at least three hydroxyl groups and an aminohydroxy compound with a functionality of at least three, in the presence of a basic catalyst; maintaining the mixture at a temperature of from 100 to 165° C. and introducing into said mixture an alkylene oxide.

It has been found, surprisingly and unexpectedly, that when a polyhydric alcohol containing at least three hydroxyl groups or an aminohydroxy compound with a functionality of at least three, is admixed with the methyl glucoside in the alkoxylation reaction, the disadvantages of the art are overcome and the resultant alkoxylated product is unhindered by undesirable color formation and high viscosity. In addition, the liquid polyol, such as glycerol, provides the solvent action for the methyl glucoside. The resultant alkoxylated product is actually a coalkoxylated product, i.e., the alkylene oxide reacts with both the methyl glucoside and the polyhydric alcohol or aminohydroxy compound, thus providing the desirable characteristics of each.

The products of the present invention may be readily cross-linked with diisocyanates to form polyurethane foams having excellent physical properties.

In the process of the present invention any polyhydric alcohol containing at least three hydroxyl groups may be employed, with the preferred polyhydric alcohols being glycerol, pentaerythritol and polypentaerythritol. The polyhydric alcohol may be aromatic or aliphatic. Other polyhydric alcohols which may be conveniently employed include the following: sorbitol, hexanetriol, trimethylol propane, anhydroenneaheptitol, pyrogallol, etc. Any aminohydroxy compound with a functionality of at least three may be employed, for example, mono-, di- or triethanolamine.

The alkoxylation reaction is accelerated by employing elevated temperatures, i.e., from 100 to 165° C. and the use of a basic catalyst, such as the conventional organic or inorganic base activators, preferably an alkali metal hydroxide, alkali metal alkoxide or tertiary amine, such as sodium hydroxide, potassium hydroxide, sodium alkoxide, sodium methylate, triethyl amine, and the like. The use of elevated temperatures and basic catalysts is conventional in the alkoxylation art. Proper use of these will be apparent to one skilled in the art. The catalyst is generally employed in an amount of between about 1 to 5 percent by weight of the polyol. The reaction is initially exothermic and cooling means are employed in order to maintain the reaction at the desired temperature.

In the foregoing reaction any alkylene oxide may be employed and preferably the lower alkylene oxides, such as ethylene or propylene oxide. Others which may be employed include, for example, butylene oxide, isobutylene oxide, N-hexyl oxide, etc.

In general, the basic catalyst is neutralized with a mineral acid, such as phosphoric, sulfuric or hydrochloric. The resultant product is a light colored liquid.

The process of the present invention will be more readily apparent from a consideration of the following illustrative examples.

EXAMPLE 1

A mixture of 388 grams (2.0 moles) of methyl glucoside, 23 grams (0.25 mole) of glycerol, and 8 grams of 85 percent potassium hydroxide was stirred and heated under nitrogen. At 120° C. the mixture was molten. In this instance, the temperature was raised to 160° C. and propoxylation carried out until 743 grams of propylene oxide had been reacted. When cool, the mixture was neutralized with 50 percent sulfuric acid, treated with 35 grams of Attapulgus clay and then stripped for an hour at 120° C./5 mm. before filtration. Analysis of the light yellow liquid gave the following values:

Hydroxyl number _____ 435
Acid number _____ 0.17
Percent water _____ 0.04
Apparent pH _____ 5.75
Viscosity 100° F. _____ cs__ 4,539

EXAMPLES 2 THROUGH 6

In the following examples the procedure of Example 1 was repeated except that the molar ratio of methyl glucoside to glycerol is as shown in the following table.

*Table 1*

| Example Number | Molar Ratio Methyl Glucoside to Glycerol | Hydroxyl Number | Acid Number | Percent Water | Apparent pH | Viscosity 100°F. Centistokes | Color |
|---|---|---|---|---|---|---|---|
| 2 | 1:1 | 426 | 0.08 | 0.26 | 6.6 | 892 | Light Yellow. |
| 3 | 2:1 | 426 | 0.24 | 0.31 | 4.7 | 811 | Do. |
| 4 | 4:1 | 391 | [1] 0.02 | 0.16 | 7.7 | 1,384 | Do. |
| 5 | 8:1 | 435 | 0.17 | 0.04 | 5.75 | 4,539 | Do. |
| 6 | 4:1 | 414 | 0.07 | 0.05 | 6.1 | ---------- | Do. |

[1] Alkaline Number.

EXAMPLE 7

A rigid polyurethane foam was prepared from the product of Example 4 by admixing the following ingredients:

100 grams of the liquid product of Example 4
25 grams of trifluorochloromethane
0.2 gram of stannous octoate
1.0 gram of triethylenediamine
64.6 grams of a mixture of isomers of tolylene diisocyanate The mixture was allowed to foam and was cured at elevated temperature. The resultant rigid polyurethane foam was white in color, had an excellent cell structure and excellent physical properties.

EXAMPLE 8

Example 1 was repeated twice with the exception that methyl glucoside was propoxylated in the absence of a polyhydric alcohol. The product was a reddish-brown, highly viscous syrup having the following properties.

Hydroxyl number:    Viscosity 100° F., centistokes
410 _____ 44,000
425 _____ 60,000

EXAMPLES 9 THROUGH 12

In the following examples the procedure of Example 1 was repeated except that pentaerythritol was employed instead of glycerol. The methyl glucoside was propoxylated until it was a stirrable liquid at about 130° C., at which time the pentaerythritol was added. The results are summarized in the following table.

*Table 2*

| Example Number | Molar Ratio Methyl Glucoside to Pentaerythritol | Hydroxyl Number | Acid Number | Percent Water | Apparent pH | Viscosity, 100° F., Centistokes | Color |
|---|---|---|---|---|---|---|---|
| 9 | 1:1 | 404 | 0.18 | 0.15 | 5.6 | 2,163 | Amber. |
| 10 | 2:1 | 412 | 0.07 | 0.12 | 6.2 | 2,782 | Do. |
| 11 | 4:1 | 409 | 0.07 | 0.11 | 7.6 | 3,733 | Do. |
| 12 | 4:1 | 450 | 0.09 | 0.09 | 5.05 | ---------- | Do. |

EXAMPLE 13

A rigid polyurethane foam was prepared from the product of Example 12 by admixing the following ingredients:

100 grams of the liquid product of Example 12
25 grams of trifluorochloromethane
0.2 gram of stannous octoate
1.1 grams of triethylenediamine
74.0 grams of a mixture of tolylene diisocyanate.

The mixture was allowed to foam and was cured at elevated temperature. The resultant rigid polyurethane foam was white in color, had an excellent cell structure and excellent physical properties.

This invention may be embodied in other forms or carried out in other ways without departing from the spirit or essential characteristics thereof. The present embodiment is therefore to be considered as in all respects illustrative and not restrictive, the scope of the invention being indicated by the appended claims and all changes which come within the meaning and range of equivalency are intended to be embraced therein.

What is claimed is:

1. A process for the alkoxylation of a mixture of methyl glucoside and a hydroxy compound which comprises admixing methyl glucoside with a hydroxy compound in a molar ratio of methyl glucoside to said hydroxy compound of between 1:0.1 and 1:10, said hydroxy compound being selected from the group consisting of glycerol, pentaerythritol, polypentaerythritol, sorbitol, hexanetriol, trimethylol propane, anhydroenneaheptitol, pyrogallol, monoethanolamine, diethanolamine, and triethanolamine, in the presence of a basic catalyst, maintaining the mixture at a temperature of from 100 to 165° C., and introducing into said mixture an alkylene oxide having between 2 and about 6 carbon atoms.

2. A process according to claim 1 wherein said alkylene oxide is propylene oxide.

3. A process according to claim 1 wherein said hydroxy compound is glycerol.

4. A process according to claim 1 wherein said hydroxy compound is pentaerythritol.

5. The process according to claim 2 wherein said polyhydric alcohol is glycerol.

6. The process according to claim 2 wherein said polyhydric alcohol is pentaerythritol.

7. The product produced by the process of claim 1.

8. The product produced by the process of claim 5.

9. The product produced by the process of claim 6.

References Cited by the Examiner

UNITED STATES PATENTS 2,407,003  9/46  Griffin _____ 260—210
3,042,666  7/62  Gentles _____ 260—210

LEWIS GOTTS, *Primary Examiner.*